Jan. 16, 1962  A. R. GETZIN  3,016,984
GAS FILTER APPARATUS
Filed Dec. 8, 1958  2 Sheets-Sheet 1

INVENTOR.
ALLAN R. GETZIN
BY
Ralph B. Quick
ATTORNEY

Jan. 16, 1962   A. R. GETZIN   3,016,984
GAS FILTER APPARATUS
Filed Dec. 8, 1958   2 Sheets-Sheet 2
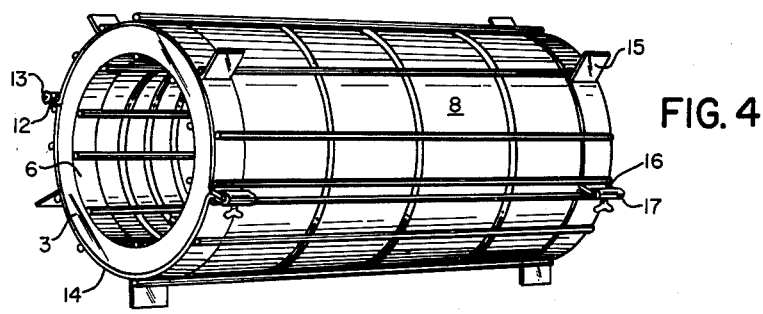
FIG. 4
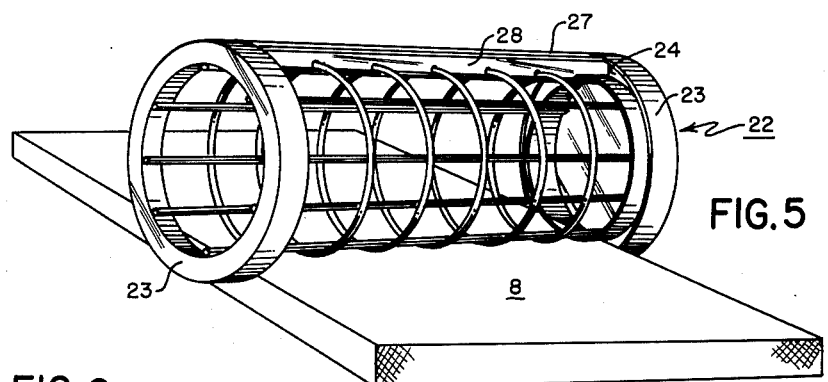
FIG. 5
FIG. 6
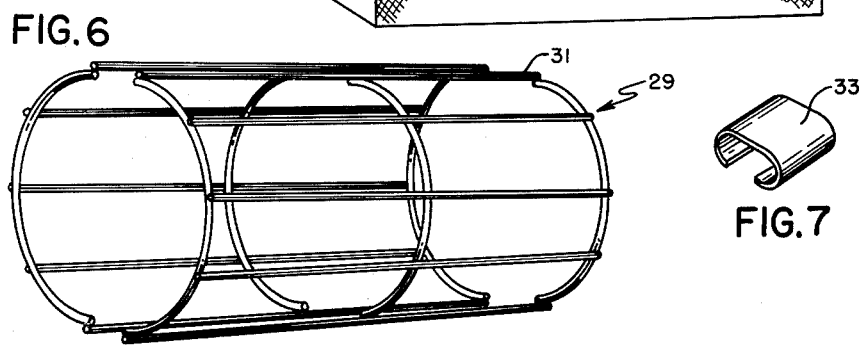
FIG. 7
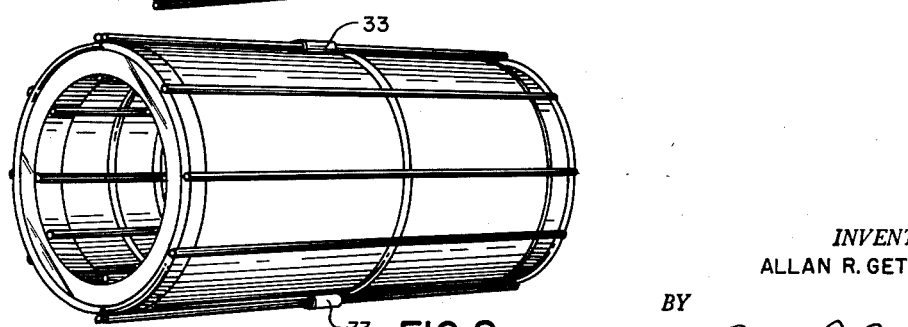
FIG. 8
INVENTOR.
ALLAN R. GETZIN
BY
Ralph B. Brick
ATTORNEY

United States Patent Office 3,016,984
Patented Jan. 16, 1962

3,016,984
GAS FILTER APPARATUS
Allan R. Getzin, Jeffersontown, Ky., assignor to American Air Filter Company, Inc., Louisville, Ky., a corporation of Delaware
Filed Dec. 8, 1958, Ser. No. 778,732
5 Claims. (Cl. 183—73)

This invention relates to gas cleaning apparatus and more particularly to gas filtering apparatus of the type which includes a replaceable filter medium.

In numerous gas cleaning operations, it is desirable to provide gas cleaning apparatus which occupies a minimum of space and, at the same time, presents a maximum of filtering surface to the gases to be cleaned. Where space is a limiting factor and a replaceable filter medium is to be used in the gas cleaning apparatus, it further is desirable that the apparatus afford ready accessibility for rapid installation and removal of such filter medium.

The present invention provides a gas cleaning apparatus which includes all of the above desired features and which further provides an economical, straightforward construction requiring a minimum of maintenance and a minimum of operating parts. Various other features of the invention will become obvious to one skilled in the art upon reading the disclosure set forth hereinafter.

More particularly the present invention provides a filter apparatus comprising a first gas pervious hollow inner housing member having an inlet opening at one end thereof, a replaceable filter medium surrounding the outer face of the inner housing member, hold down means cooperable with the inner housing member and engageable with the filter medium and a gas pervious outer housing member removably surrounding the filter medium to retain the filter medium in place.

It is to be understood that various changes can be made by one skilled in the art in the arrangement, form and construction of the several parts of the apparatus disclosed herein without departing from the scope or spirit of this invention.

Referring to the drawings:

FIGURE 4 is a perspective view of the filter apparatus of FIGURE 3 after assembly;

FIGURE 5 is a perspective view of a modified embodiment of a grid inner housing member of the present invention;

FIGURE 6 is a perspective view of the semi-cylindrical panel portions of a modified grid outer housing member to be used with the inner housing member of FIGURE 5;

FIGURE 7 is an enlarged perspective view of a resilient spring clip member used with the filter apparatus of FIGURES 5 and 6;

FIGURE 8 is a perspective view of the filter apparatus of FIGURES 5-7 after assembly.

Figure 1:
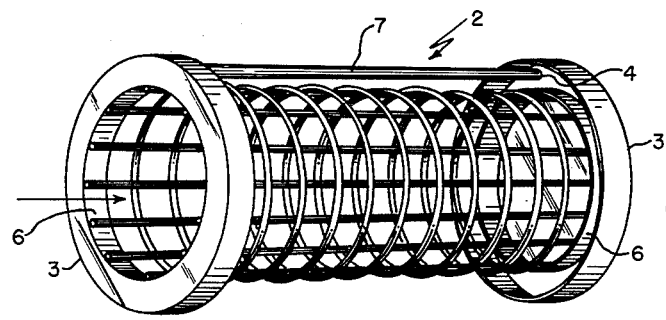
FIGURE 1 is a perspective view of one advantageous embodiment of a grid inner housing member of the present invention.

Referring to FIGURE 1 of the drawings, there is disclosed a cylindrical member 2 which can be formed from welded steel wire in the form of a grid to permit free flow of gases, such as air, therethrough, the cylindrical member 2, as will be seen hereinafter, serving as the inner housing member of the inventive filter apparatus.

Fastened to opposite extremities of member 2 by some suitable means such as welding are the lipped end caps broadly designated by the reference numeral 3. It is to be noted that the diameters of end caps 3 are substantially larger than the diameter of cylindrical member 2, the lipped portion of the caps serving to provide a pair of facing annular channel members 4 (only one of which is shown in the perspective views) extending respectively around the extremeties of the cylindrical member 2. It also is to be noted that each of caps 3 is provided with an inner concentric ring 6 which snugly engages the outer face of cylindrical member 2 to insure positive and effective assembly of caps 3 to member 2, the caps being fixed to member 2 by some suitable means such as welding. While the face portion of one of caps 3 is closed to form an end seal at one extremity of cylinder member 2, the face portion of the other cap 3 is cut away to provide a gas inlet at the other extremity of the cylindrical member, attention being directed to the arrow which indicates the direction of gas flow.

Figure 3:
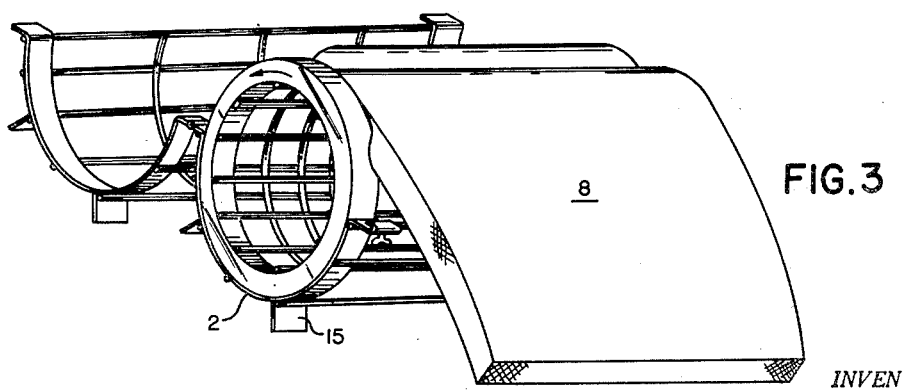
FIGURE 3 is a perspective view of a partially assembled filter apparatus disclosing the filter medium partially surrounding the outer face of the inner housing member.

Mounted to and extending between the faces of opposite caps 3 intermediate channel members 4 is a rod 7, the rod 7 being positioned to run in substantially parallel relation to the longitudinal axis of cylindrical member 2 and in spaced relation to the outer face of member 2. As will be apparent from FIGURE 3 of the drawings, rod 7 serves as a hold down means for the insertion of one end of a filter medium 8, the end of the medium being tucked in compressed form between the rod and the face of inner cylindrical housing member 2 and the medium wrapped around the outer face of the inner housing member to completely surround the same. It is to be noted that, as the medium 8 is wrapped around cylindrical member 2, the opposite edges of the medium are tucked into hold down position in the facing annular channel members 4 and that the free end of the medium 8 overlaps the end of medium 8 tucked beneath rod 7.

Figure 2:
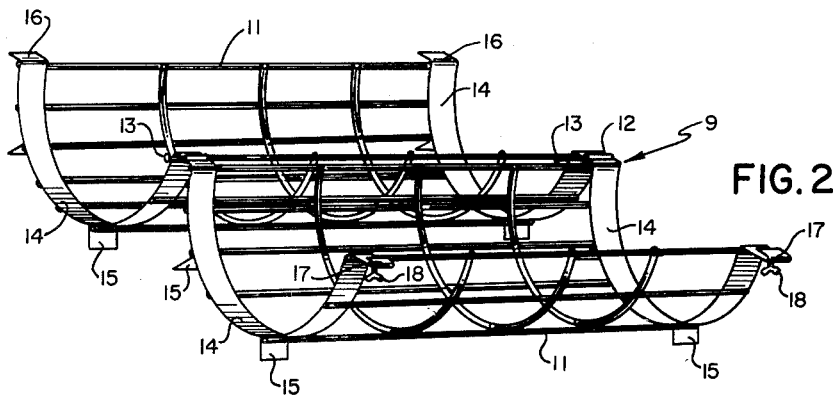
FIGURE 2 is a perspective view of one advantageous embodiment of a grid outer housing member which can cooperate with the inner housing member of FIGURE 1 to retain a filter medium in place.

To retain medium 8 in place, an outer housing member 9 is provided. Referring to FIGURE 2 of the drawings, housing member 9 includes two mating semi-cylindrical steel welded wire grid panel portions 11, one set of mating edges of the panel portions being pivotally hinged together at their extremities by means of a conventional hinge arrangement 12. In this connection, it is to be noted that each of hinge members 12 is provided with an elongated pin 13 to permit limited sliding movement of one panel 11 relative to other along the hinge axis. Each of panel portions 11 is provided at its extremities with a semi-cylindrical band member 14, and each of band members 14 is provided along its outer periphery with spaced, protruding aligning and supporting tabs 15. The band members on one panel portion terminate in projecting tongue members 16 and the band members on the other panel portion terminate in U-shaped tongue receiving member 17. A hold-down wing nut 18 is threaded in a through aperture provided in each of members 17.

Once filter medium 8 has been properly inserted in surrounding relation around cylindrical inner housing member 2 with the edges of medium 8 tucked into facing annular channel members 4, outer housing member 9 is assembled into surrounding position around inner housing member 2 to retain medium 8 in place. In this connection, it is to be noted that the aforementioned provision for limited movement of one panel 11 relative to the other along the hinge axes permits tongues 16 of one panel portion 11 to slidably engage in U-shaped tongue receiving members 17. With the tongues in proper engagement and bands 14 embracing the outer face of the lip portions of end caps 3, wing nuts 18 are rotated to clamp outer housing 9 firmly into filter medium retaining position. Thus, in a straightforward and economical manner, the inventive filter apparatus is assembled and ready for use in a limited space, providing ready accessibility for removal and replacement of the maximum surface filter medium therein. With respect to the filter medium, it is to be understood that the apparatus can accommodate any one of a number of known types of flexible compressible mediums. For example, in a diesel engine installation incorporating the inventive apparatus for cleaning air used in the engine, Fiberglas medium 25FG or 50FG has been found to be quite satisfactory.

Referring to FIGURES 5 through 8, a modification of the present invention is disclosed. In this modification, a steel wire grid cylindrical housing member 22 is provided including end caps 23 similar to the end caps 3 described above. A rod 27 in the form of a T-shaped channel member integrally connects end caps 23, the recesses 28 formed by the T-shaped channel member and the facing annular channels 24 formed by end caps 23 serving to receive the ends and edges respectively of filter medium 8. As can be seen in FIGURE 6, the outer housing member 29 includes two semi-cylindrical steel wire grid panel portions 31. Once a filter medium has been properly assembled in surrounding relation to the inner housing member 22, the semi-cylindrical shells 31 are arranged to surround the filter medium. The shells then are fastened together in mated relationship with the readily applied resilient spring clip members 33 which serve to grip adjacent mating edges of the shells. The final assembly as disclosed in FIGURE 8, like the first assembly of FIGURE 4, is ready for use in a limited space, providing convenient accessibility for removal and replacement of the maximum surface filter medium disposed therein.

The invention claimed is:

1. A filter apparatus comprising a gas pervious hollow inner housing member having an inlet opening at one end thereof, a replaceable filter medium surrounding the outer face of said inner housing member, an assembly hold-down means integral with said inner housing member and engageable with said filter medium, said hold-down means including a rod member extending in fixed relationship with and between opposite ends of said inner housing member and spaced from the outer face of said inner housing member to define an insert space with said outer face to accommodate one end of said filter medium therein, and a gas pervious outer housing member removably surrounding said filter medium to retain said filter medium in place.

2. A filter apparatus comprising a gas pervious hollow inner housing member having an inlet opening at one end thereof, a replaceable filter medium surrounding the outer face of said inner housing member, an assembly hold-down means integral with said inner housing member and engageable with said filter medium, said hold-down means including a rod member extending between opposite ends of and spaced from the outer face of said inner housing member to define an insert space with said outer face to accommodate one end of said filter medium therein and channel members extending from the extremities of said inner housing member to accomodate the edges of said filter medium therein, and a gas pervious outer housing member removably surrounding said filter medium to retain said filter medium in place.

3. A filter apparatus comprising a gas pervious inner hollow housing member having an inlet opening at one end thereof, a replaceable filter medium surrounding the outer face of said inner housing member, an assembly hold-down means integral with said inner housing member and engageable with said filter medium, said hold down means including a rod member extending between opposite ends of and spaced from the outer face of said inner housing member to define an insert space with said outer face to accomodate one end of said filter medium therein and channel members extending from the extremities of said inner housing member to accomodate the edges of said filter medium therein, the extremities of said rod member being fastened to said channel members, and a gas pervious outer housing member removably surrounding said filter medium to retain said filter medium in place, said outer housing member including at least two panel portions and fastening means to hold pairs of mating edges of said panel portions together, the fastening means for at least one pair of edges being detachable to permit said outer housing member to be in removable retaining position around said filter medium.

4. A filter apparatus comprising a cylindrical grid inner housing member having an inlet opening at one end thereof, said inner housing member including a pair of facing annular channel members fastened to and extending respectively around extremities thereof, a rod member having its extremities fixed to said facing channel members in spaced relation from the outer face of said inner housing member, a replaceable compressible filter medium having one end thereof engaged between said rod member and the outer face of said inner housing member, said filter medium surrounding the outer face of said inner housing member with its opposite edges engaged in said annular channel members, and a grid outer housing member to retain said filter medium in place, said outer housing member including a pair of facing semi-cylindrical grid panels having one set of mating edges pivotally hinged together, and clamping means to releasably hold the other set of mating edges together in surrounding and retaining position around said filter medium.

5. A filter apparatus comprising a cylindrical grid inner inner housing member having an inlet opening at one end thereof, said inner housing member including a pair of facing annular channel members extending respectively from the extremities thereof, a rod member mounted between said facing channel members in spaced relation from the outer face of said inner housing member, a replaceable compressible filter medium having one end thereof engaged between said rod member and the outer face of said inner housing member, said filter medium surrounding the outer face of said inner housing member with the opposite edges of the medium engaged in said annular channel members, and a grid outer housing member to retain said filter medium in place, said outer housing member including a pair of facing semi-cylindrical grid panels, and resilient clip members to hold the mating edges of said grid panels together in surrounding and retaining position around said filter medium.

References Cited in the file of this patent

UNITED STATES PATENTS

| | | |
|---|---|---|
| 858,154 | Conversy | June 25, 1907 |
| 934,076 | Kneuper | Sept. 14, 1909 |
| 1,693,741 | Wuest | Dec. 4, 1928 |
| 2,406,188 | Beatty | Aug. 20, 1946 |

FOREIGN PATENTS

| | | |
|---|---|---|
| 295,915 | Germany | of 1916 |
| 663,382 | Great Britain | of 1951 |